(12) United States Patent
Gaya

(10) Patent No.: US 8,307,425 B2
(45) Date of Patent: Nov. 6, 2012

(54) PORTABLE COMPUTER ACCOUNTS

(75) Inventor: Bruce Gaya, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1444 days.

(21) Appl. No.: 11/499,170

(22) Filed: Aug. 4, 2006

(65) Prior Publication Data

US 2008/0034091 A1    Feb. 7, 2008

(51) Int. Cl.
*G06F 7/04* (2006.01)

(52) U.S. Cl. ............... 726/21; 726/4; 726/17; 709/218; 709/219; 709/225; 380/229

(58) Field of Classification Search .................... 726/21; 709/225; 380/229

See application file for complete search history.

(56) References Cited

U.S. PATENT DOCUMENTS

| | | | | |
|---|---|---|---|---|
| 5,784,612 A * | 7/1998 | Crane et al. | | 713/100 |
| 7,120,785 B1 | 10/2006 | Bowers et al. | | |
| 7,275,085 B1 * | 9/2007 | Tran | | 709/217 |
| 7,428,585 B1 * | 9/2008 | Owens et al. | | 709/223 |
| 7,484,089 B1 * | 1/2009 | Kogen et al. | | 713/156 |
| 7,512,971 B2 * | 3/2009 | Ellington | | 726/6 |
| 2003/0084306 A1 * | 5/2003 | Abburi et al. | | 713/188 |
| 2003/0115224 A1 * | 6/2003 | Obara et al. | | 707/204 |
| 2003/0174167 A1 * | 9/2003 | Poo et al. | | 345/752 |
| 2004/0172552 A1 * | 9/2004 | Boyles et al. | | 713/200 |
| 2005/0114296 A1 * | 5/2005 | Farber et al. | | 707/1 |
| 2005/0216624 A1 * | 9/2005 | Deng et al. | | 710/74 |
| 2006/0129627 A1 * | 6/2006 | Phillips et al. | | 709/200 |
| 2009/0178127 A1 * | 7/2009 | Ogino et al. | | 726/7 |

OTHER PUBLICATIONS

Burr et al, Electronic authentication guideline Information security NIST Technology administration, NIST Special publication 800-63 Version 1.0.2 64 pages Apr. 2006.*
Pietro et al "A Two-Factor Mobile Authentication Scheme for Secure Financial Transactions" Proceedings of the international conference on Mobile business 7 pages, 2005 IEEE computer society.*
Handbook for user authentication for FortiOS product; 236 pages, Portinet Inc. 2011.*

* cited by examiner

*Primary Examiner* — Taghi Arani
*Assistant Examiner* — Jason Lee
(74) *Attorney, Agent, or Firm* — Womble Carlyle Sandridge & Rice LLP

(57) ABSTRACT

User accounts, authentication information and user home directories are stored on an external storage media that can be transferred from one device to another. Measures are included for detecting tampering of stored information and for preventing possibly conflicting or damaging account and file information from entering a host device.

14 Claims, 8 Drawing Sheets

PORTABLE COMPUTER ACCOUNTS

TECHNICAL FIELD

The subject matter of this application is generally related to computer account management.

BACKGROUND

User account data typically includes a user name, an account identifier, a home directory location and management information. For local accounts (i.e., non-network accounts) this information can be stored on a local directory database on a host device. For network accounts, account information can be stored on a network directory server (e.g. LDAP).

User authentication information (e.g., a password) can be stored separately. For local accounts, a secure hash of a password can be located in a secure area of a boot hard drive. For network accounts, passwords can be located on an authentication server (e.g., Kerberos™).

User home directories are typically the main area where a user keeps their files. For local accounts, the home directory can be located on a local hard disk. For network accounts, the home directory can be located on a network file server. It is often desirable to synchronize versions of home directory folders locally and on the network so that when a user goes offline they can continue to work just as if they were connected to the network.

Some known operating systems provide a portable home directory system. For example, Portable Home Directories (PHDs) is the name of a system in Apple Computer Inc.'s Mac® OS X, where a network account, user authentication information and a network home directory can be cached locally on a host device and synchronized with their originals on network servers. The user home directory can be encrypted using a known encryption technology (e.g., FileVault™) and decrypted using, for example, the user's login password.

While conventional portable home directory systems are useful they do not allow a user to transport on an external storage media a complete home directory and account between networked computers without performance degradation (e.g., synchronization delay).

SUMMARY

User accounts, authentication information and user home directories are stored on an external storage media that can be transferred from one device to another. Measures are included for detecting tampering of stored information and for preventing possibly conflicting or damaging account and file information from entering a host device.

In some implementations, a method comprises: providing a login screen for presentation on a display screen of a host device, the login screen including a list of accounts available for log in, where at least one account is associated with an external storage media operatively coupled to the host device; receiving a first input from a user of the host device, the input specifying for log in the local account associated with the external storage media; responsive to the first input, determining if the local account has a corresponding network account; if the local account has a corresponding network account, using the network account and associated authentication methods to authenticate the user of the host device; and if the local account does not have a corresponding network account, using information locally accessible by the host device to authenticate the user.

Other implementations of portable computer accounts are disclosed, including implementations directed to systems, methods, apparatuses, computer-readable mediums and user interfaces.

DETAILED DESCRIPTION

Portable Computer Account System

Figure 1:
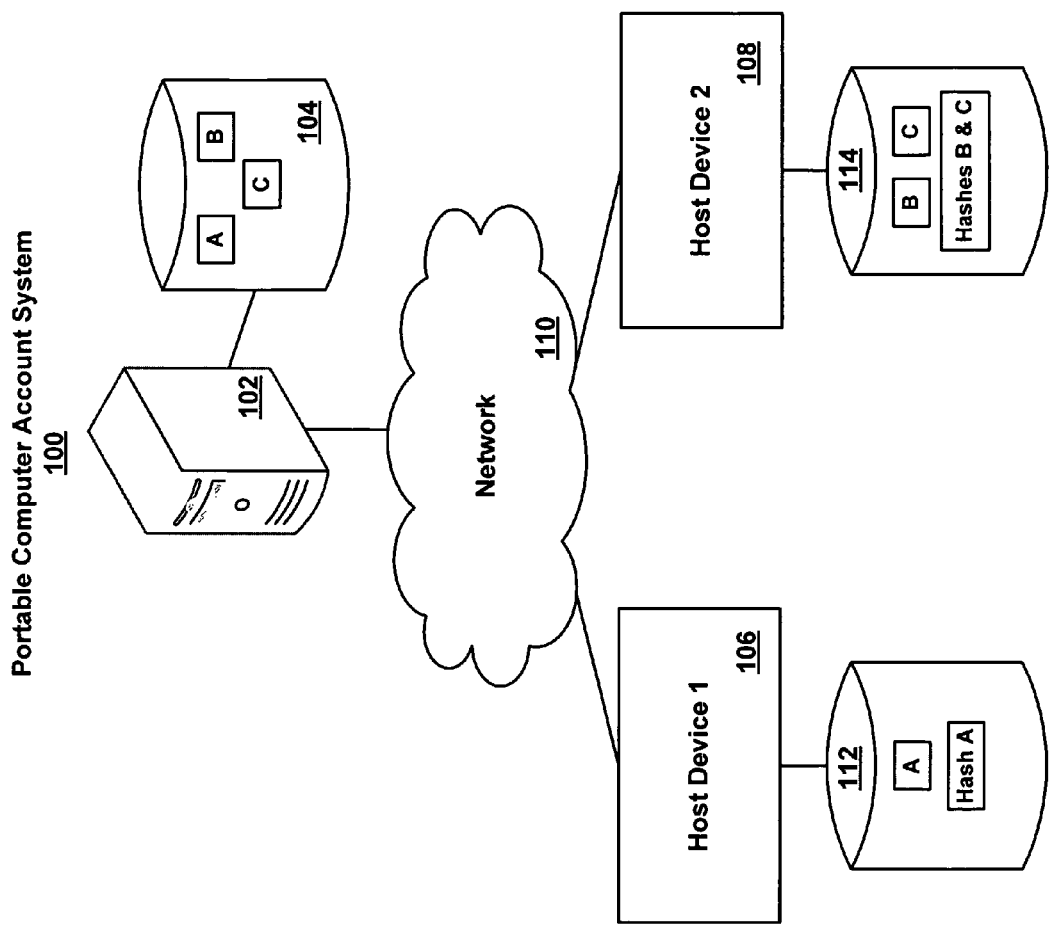
FIG. 1 is a block diagram of an exemplary portable computer account system.

FIG. 1 is a block diagram of an exemplary portable computer account system 100. The portable computer account system 100 allows the owner of a network account to retrieve a full copy of account information and data contents from a network server and to store the information on an external storage drive attached to a host device which is connected to the network. The account copy, herein referred to as a portable computer account, can be accessed and modified as though the user were logged into the network account. The portable computer account can later be synchronized with the network-resident account data. Data synchronization may be provided with any file synchronization tool or service, for example, iDisk™ or Apple Portable Home Directory™ by Apple Computer of Cupertino, Calif. An example of a framework for implementing synchronization in an application is Apple's "Sync Services" which is publicly available on Apple's developer website (http://developer.apple.com). Once the portable computer account is created within the external storage media, it may be accessed locally on a host machine without the need for network connectivity. The portable computer account can be encrypted and/or password protected to keep its contents secure. Any known encryption technique may be used (e.g., RSA, PGP, DES, AES). The portable computer account may be tamper-resistant such that a user can not modify network account information and upload it during network account synchronization.

A computer network 110 includes a network server 102 and a network storage device 104. Any number of user accounts exist on the computer network 110. User account information for users A, B, and C is stored on the network storage device 104. The user account information may include user profile information, security information, a home directory path and its contents, etc. A first host device 106 is connected to the network 110. User A connects to the first host device 106 to access account A stored on network storage device 104. User A downloads a copy of the account A information and creates a portable computer account on a first external storage media 112 connected to the first host device 106. The first external storage media 112 may be any type storage media with adequate storage space connected to the first host device 106 via any type connection, e.g. FireWire®, USB, etc. The information contained within the portable computer account A may include, but is not limited to, user preferences, security settings, and home directory contents. The portable computer account A can be encrypted as well as password protected. A hash of user A's security password is also stored within the external storage media 112. The password hash allows the host device 106 to protect the portable computer account A by providing a secure login method in the event that the network 110 is not accessible to the host device 106 when user A wishes to access the portable computer account A. Examples of authentication techniques for portable computer accounts is described in U.S. patent application Ser. No. 10/867,299, for "A Method and Apparatus for Authenticating User Access," filed Jun. 14, 2004, which patent application is incorporated by reference herein in its entirety.

Similarly, user B and user C connect to the network 110 via a second host device 108 to create portable computer accounts of account B and account C. The account B and account C portable computer accounts and the password hashes for accounts B and C are stored within a second external storage media 114 connected to the second host device 108. The portable computer accounts can be accessible to the users when network 110 is not available. Once the connection with network 110 has been re-established, any changes made to the data within the portable computer accounts can be synchronized with the network data residing within the network storage media 104. Any method of synchronization may be used. In one implementation, the account information within the portable computer accounts may be tamper-guarded such that modified account information, such as user privileges or security data, will not be synchronized with the network data.

Figure 2A:
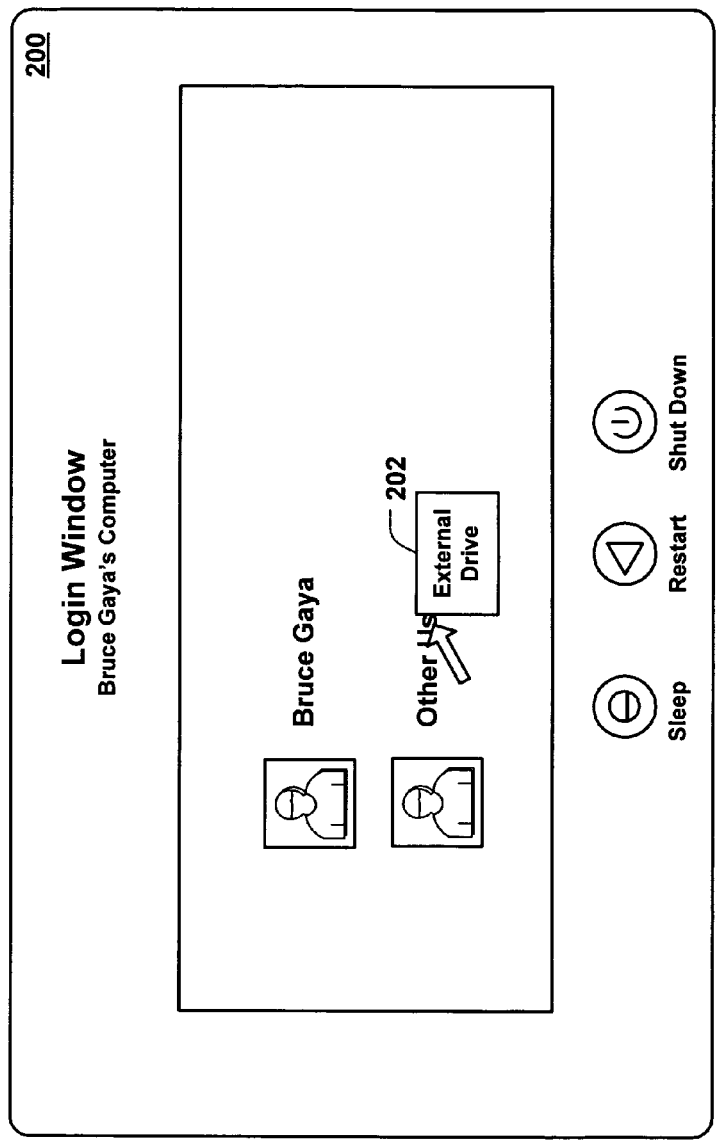
FIG. 2A is a screenshot of an exemplary account login window.

FIG. 2A is a screenshot of an exemplary account login window 200 for a multi-user host device. The multi-user device may be a personal computer, network terminal device, laptop computer, or any other device capable of allowing multiple users access to a computer network such as network 110 (FIG. 1). A user may select between two accounts available within the login window 200. Selection of a user account provides the user with login ability for that account.

A cursor is placed above the account name of the second user account available within the login window 200. The mouse-over of the account name causes a dialog box 202 to appear. Within the dialog box 202, a message, "external drive", alerts the user that the second user account exists within an external storage media. In one implementation, this may signify that the external storage media containing the second user account is presently connected to the host device displaying the login window 200, and that a portable computer account exists within the external storage media. In one implementation, a modified account icon or additional account name description may alert the user that the account is a portable computer account accessible from an external storage media.

Figure 2B:
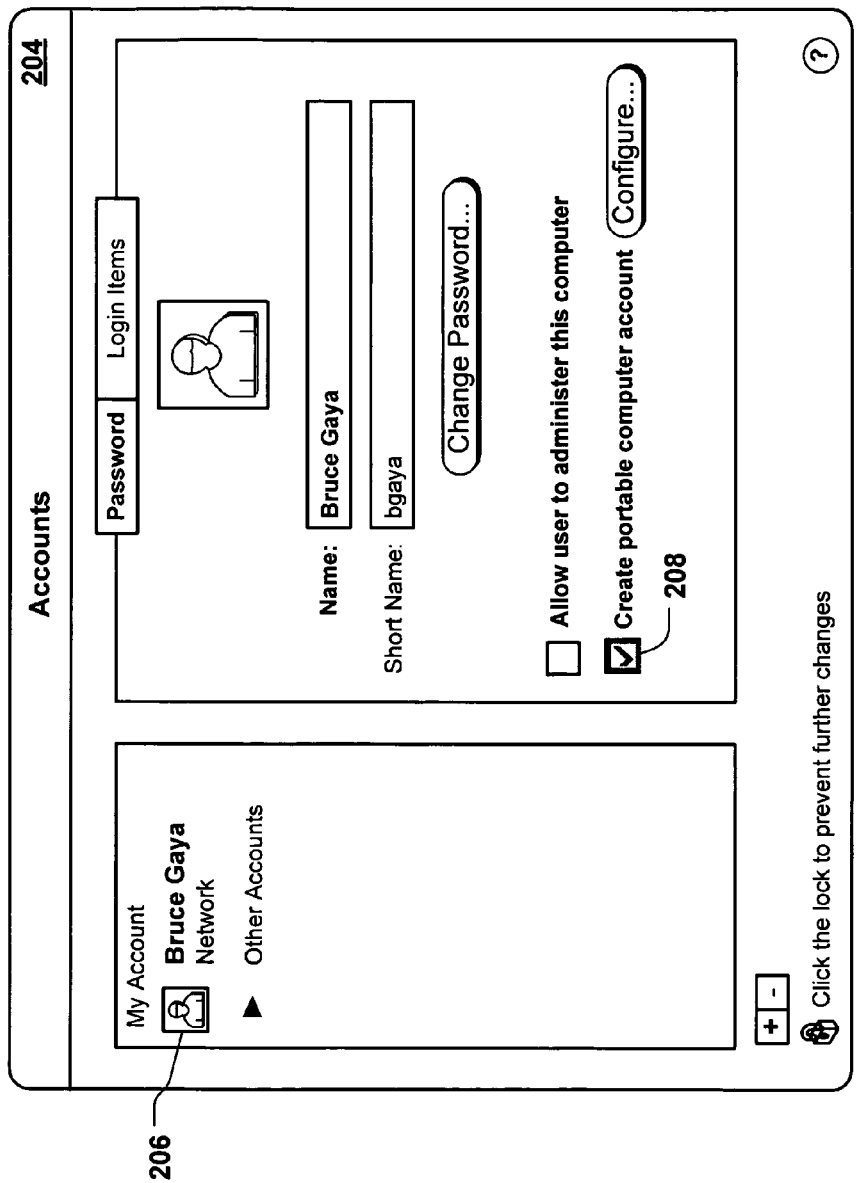
FIG. 2B is a screenshot of an exemplary accounts system preference pane.

FIG. 2B is a screenshot of an exemplary accounts system preference pane 204. The preference pane 204 provides a user with options regarding that user's account information. For example, a user may be capable of accessing and/or modifying password settings, account privileges, system preferences, etc. through the preference pane 204. In one implementation, the preference pane 204 may be accessed through a desktop menu.

A user is logged into an existing network account 206 through a host device connected to a network. The preference pane 204 provides the user with the option to create a portable computer account using a checkbox 208. In one implementation, a portable computer account may be created on an external storage media. A configure button associated with the checkbox 208 may provide further control over portable computer account details. For example, the configure button may provide the user with external storage media selection, account encryption options, etc.

Portable Computer Account Creation Process

Figure 3:
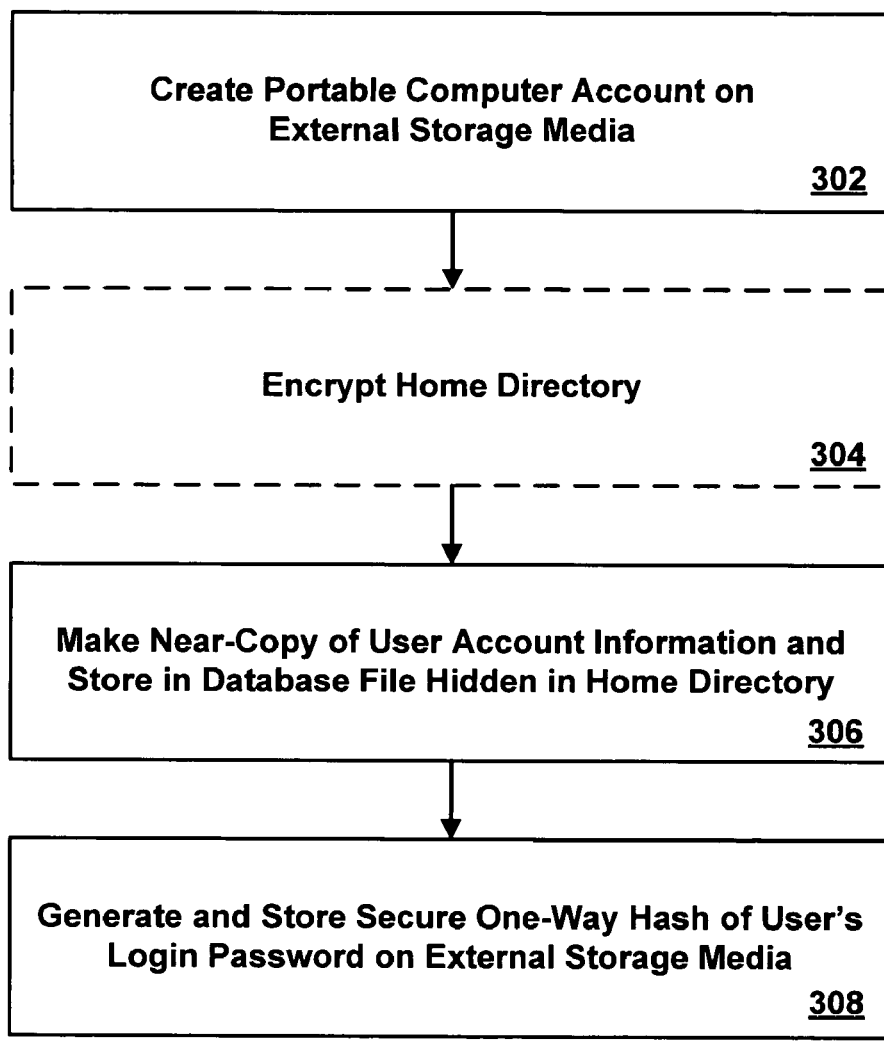
FIG. 3 is a flow diagram of an exemplary portable computer account creation process.

FIG. 3 is a flow diagram 300 of an exemplary portable computer account creation process. A user may wish to create a portable computer account to obtain a local copy of information contained within a network account. The user may also wish to enable offline access to personal data stored within the network account. A network account may include, but is not limited to, an account name, password, user information, and home directory data. A user logs into a network account through a host device. The user attaches an external storage media to the host device and instructs the creation engine running on the host device to create a portable computer account of the user's network account on the external storage media (step 302). In one implementation, the user may create the portable computer account using the accounts system preference pane 204 as described in FIG. 2B. The creation engine running on the host device creates a home directory within the external storage media and downloads an initial copy of the network home data to the home directory.

During portable computer account creation, the creation engine may optionally encrypt the data (step 304). Any encryption method may be used. The encrypted data could be protected with the user's network password or with another means of secure access.

Next, the creation engine makes a near-copy of the user's account information and stores it in a database file (step 306). The account information is a near-copy rather than a copy because it is modified to function properly within the environment of the external storage media and the host device system. For example, the home directory path may be updated to reflect the path to the home directory within the external storage media. The near-copy may be stored within the user's new home directory on the external storage media. In another implementation, the near-copy is stored separately from the home directory, for example within the same parent folder, such that it can be read without decrypting the home directory.

The creation engine now generates and stores a secure one-way hash of the user's network login password on the external storage media (step 308). The creation engine stores the password hash separately from any data which has been encrypted using that password. The password hash allows the user to log into the account securely without requiring access to the network. In one implementation, another authentication technique can be used, for example, one utilizing the encryption engine in MAC OS® X FileVault™ by Apple Computer, Inc. of Cupertino, Calif., U.S.A.

Portable Computer Account Login Process

Figure 4A:
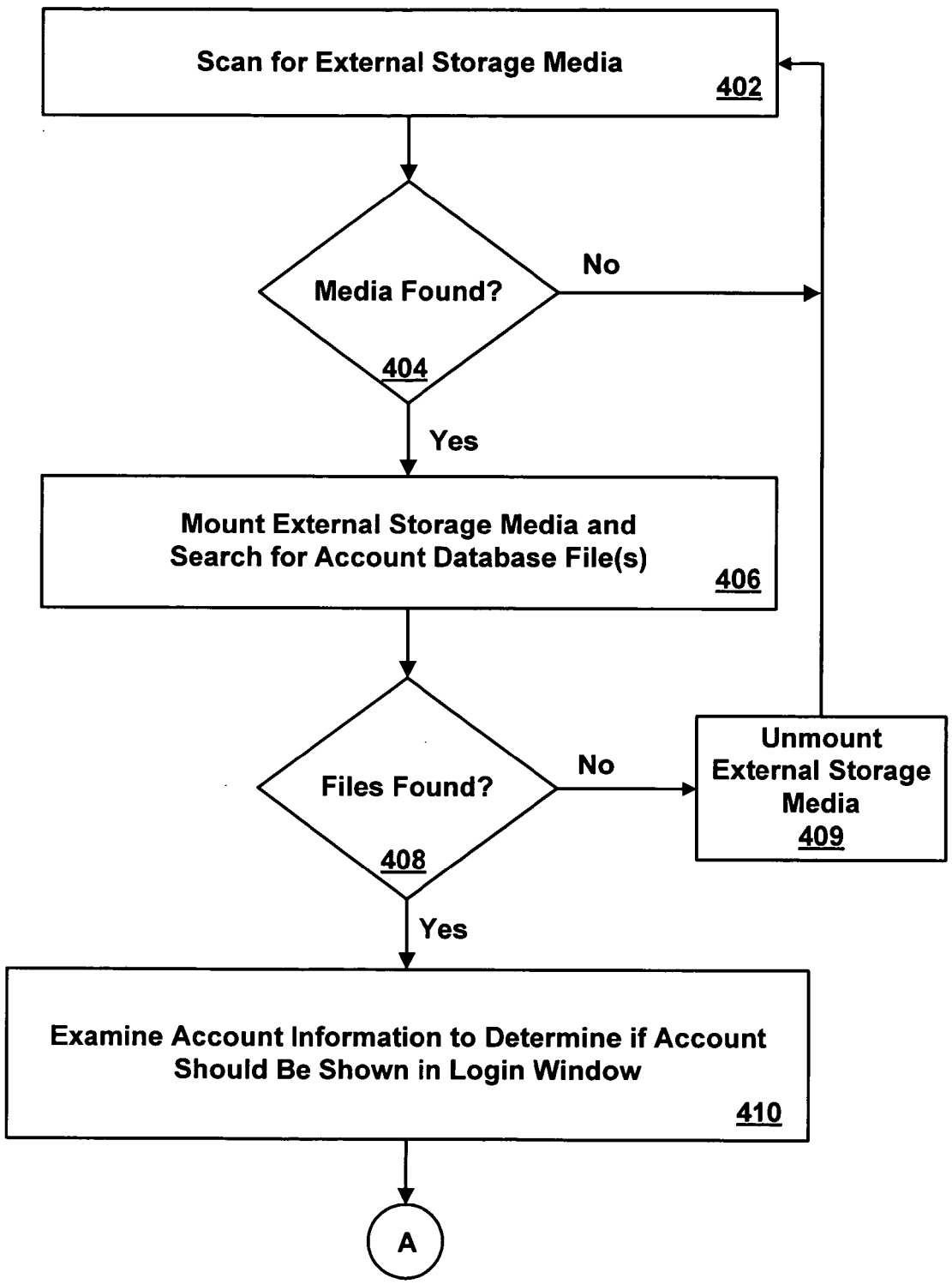
FIGS. 4A-4C are flow diagrams of an exemplary portable computer account login process.

FIG. 4A is a flow diagram of an exemplary portable computer account login process 400. The portable computer account software running on the host device locates and lists portable computer accounts for user access. The host device may be, but is not limited to, a personal computer, network access terminal, laptop computer, mobile phone, personal digital assistant (PDA), media player, etc. The portable computer account login process 400 may begin, for example, at system start-up or when a current user logs out of the host device. Alternatively, the process 400 may be user or event triggered, for example when the host device recognizes the addition of external storage media.

The portable computer account login process 400 begins by scanning the host device for external storage media (step 402). There may be any number of external storage media attached to the host device. The external storage media may be connected to the host device in any suitable manner, i.e., Firewire®, USB, wireless, etc. The process 400 continues to scan until external storage media is found (step 404).

Once external storage media is located, the process 400 mounts the external storage media and searches it for account database files associated with a portable computer account (step 406). Any number of account database files may be stored within an external storage media. If no account database files are located within the external storage media, the process 400 unmounts the external storage media (step 409) and continues to scan for further external storage media (step 402).

Once an external storage media containing account database files has been found (step 408), the process 400 examines the account information within the account database file to determine whether or not the account should be shown within the login window (step 410). In one implementation, the login window may be the login window 200 as described in FIG. 2A. In one implementation, the process 400 may not allow the account to be added to the login window if another account of the same name or identifier already exists within the local directory database of user accounts. In one implementation, the account may not be added to the local directory database because the process 400 has, for some reason, deemed it detrimental to the security of the host device.

Figure 4B:
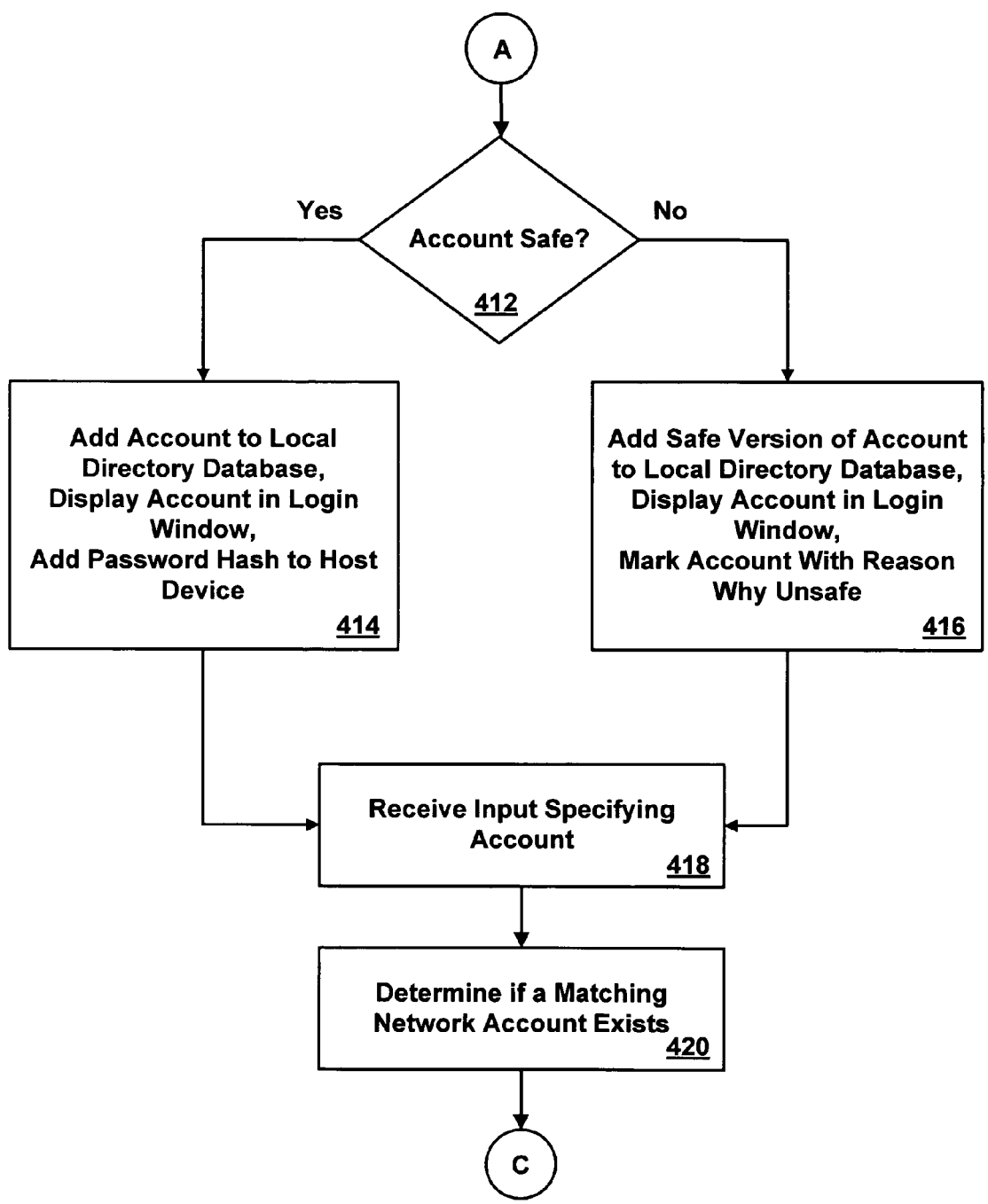

FIG. 4B is a continuation of the flow diagram 400 of an exemplary portable computer account login process 400. The process 400 considers whether or not the portable computer account it has located is safe for the host device (step 412). In one implementation, an account is deemed unsafe if it poses any threat to the security of the host device. For example, an unsafe account may be one which has administrative privileges. If the process 400 determines that the account is safe (step 412), the process 400 adds the account to the local directory database, displays the account within the login window, and adds a hash of the account's password to the host device (step 414). In one implementation, the account is displayed within the login window 200, as described in FIG. 2A.

If, instead, the process 400 decides that the account is not safe (step 412), the process 400 adds a safe version of the account to the local directory database, displays the account information within the login window, and marks the account with the reason as to why it is considered unsafe (step 416). In one implementation, to create a safe version of an account, the process 400 may remove any access rights and privileges that could provide the user with the opportunity to corrupt the host device. For example, the process 400 may remove administrative privileges from the account before allowing it to be added.

In marking the account with the reason why it was deemed unsafe, in one implementation, the process 400 associates an icon with the account which signifies the purpose of the account modification. In another implementation, a mouse-over of the account listing can provide details regarding its unsafe status, for example within a dialog box (e.g., dialog box 202). Any other method of marking an unsafe account may instead be used.

Rather than adding the safe version of the account to the local directory database, in one implementation, the process 400 adds the safe version to a temporary directory listing, pending user validation (e.g. password acceptance). In one implementation, the process 400 does not add the account to the database due to restrictions such as duplicate account identification. In this circumstance, the process 400 may notify the user as to reason of the failure of account addition, and then the process 400 may return to scanning for external storage media (step 402).

Once the account has been added to the local directory database, the process 400 next receives user input specifying an account selection (step 418). In one implementation, the user selects from accounts displayed within a login window such as the login window 200, described in FIG. 2A. The process 400 compares the account information stored within the external storage media to accounts available on the network to determine if a matching network account exists (step 420). In one implementation, the process 400 compares one or more account identifiers (e.g. user name, "short name", globally unique identifier (GUID), etc) to information available within directory servers bound to the host device.

Figure 4C:
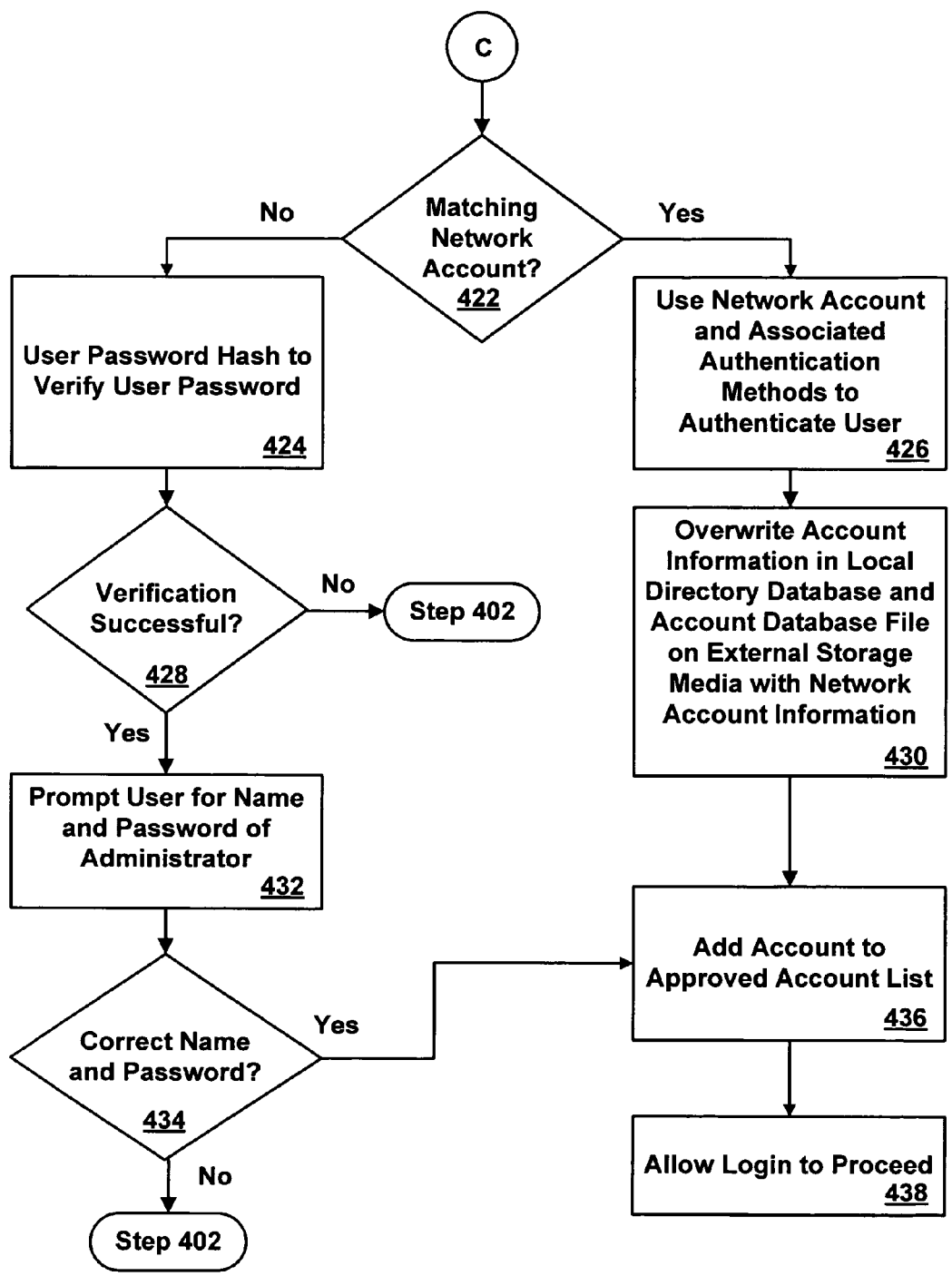

In FIG. 4C, the flow diagram of an exemplary portable computer account login process 400 continues. If the process 400 does not locate a matching network account (step 422), the process 400 uses the network account password hash for the user verification login process (step 424). This option allows the user to login to the portable computer account via the host device when the network is disconnected or otherwise unavailable. In one implementation, the process 400 may use a verification method other than a password hash to establish user validity. If the verification is unsuccessful (step 428), the process 400 denies the user login and returns to scanning for external storage media (step 402). The user may be given any number of attempts at password validation before login refusal occurs.

If the verification is successful (step 428), the process prompts the user for the name and password of an administrator account within the host device (step 432). This can verify that the user has local directory access rights within this machine. It can also provide a means of guarding against users who wish to corrupt the host device. If the user is unable to provide a correct name and password for an administrator account within the host device (step 434), the user is denied login. The user may be allowed any number of attempts before login refusal occurs. The process 400 then returns to scanning for external storage media (step 402).

If the administrator account verification is instead successful (step 434), the process 400 adds the portable computer account to the approved account list (step 436). In one implementation, account approval signifies that the step of providing administrator login verification may not be required the next time the user logs into this account through this host device. In one implementation, the user may have the option, for example via a checkbox within the login dialog, as to whether or not the account should be added to the approved list. For example, the computer administrator may wish to only temporarily allow portable computer account login so that he can be personally involved when a portable computer account is used on his computer or device. The login is allowed to proceed (step 438). In one implementation, the process 400 decrypts the home directory data within the external storage media and the user now has access to the portable computer account.

In the circumstance that the user's matching network account had been found (step 422), the process 400 uses the network account and its associated authentication methods to authenticate the user (step 426). In this manner, the user's network account, even when copied to a host device to be accessed locally, may benefit from the security measures provided by the network account access method. Additionally, by logging in via the network rather than using the locally-stored password hash, the host device has immediate access to the network-resident account information to perform data synchronization if desired.

The process 400 overwrites the user's network account information in the local directory database and the account database file stored on the external storage media with the network account information (step 430). This allows for immediate synchronization of the locally-stored account information. In one implementation, the locally-stored account information is selectively updated, such that, for example, the home directory path isn't overwritten to point to a directory path which does not exist within the external storage media.

The process 400 adds the portable computer account to the approved account list (step 436). In one implementation, addition to the approved account list may mean that, in the event of the network being unavailable during the next login attempt, matching the password of the locally-stored hash will be adequate to gain access to the portable computer account. In one implementation, the user may have the option, for example via a checkbox within the login dialog, as to whether or not the account should be added to the approved list. For example, the user may wish to leave the extra level of security within the login process to protect the portable computer account.

The login is allowed to proceed (step 438). In one implementation, the process decrypts the home directory data within the external storage media and the user now has access to the portable computer account. The process 400 may additionally synchronize the home directory within the external storage media with the network home directory data. In one implementation, user authorization is required for home directory data synchronization to occur. In one implementation, any other accounts found within the external storage media which are not on the approved list may now be removed from the host device account listing.

Host Device Architecture

Figure 5:
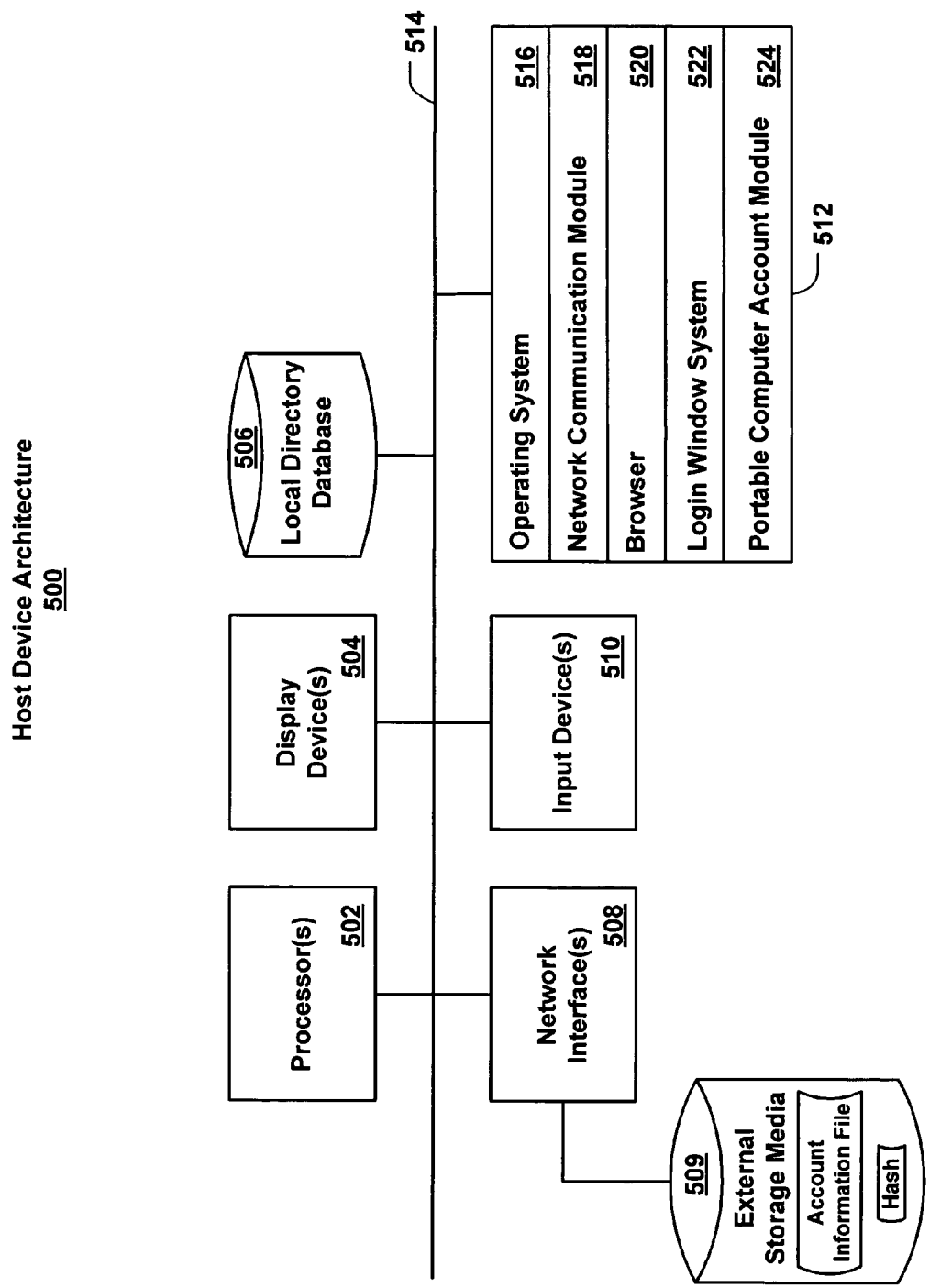
FIG. 5 is a an exemplary host device architecture.

FIG. 5 is a block diagram of an exemplary host device architecture 500 for hosting the process 400, described in reference to FIGS. 4A-4C. Other architectures are possible, including architectures with more or fewer components.

In some implementations, the host device architecture 500 includes one or more processors 502 (e.g., dual-core Intel® Xeon® Processors), a display device 504 (e.g., an LCD), a local directory database 506, a network interface 508 (e.g., a Ethernet, USB, Firewire®), one or more input devices 510 (e.g., mouse, keyboard) and one or more computer-readable mediums 512 (e.g., RAM, ROM, SDRAM, hard disk, optical disk, flash memory, SAN, etc.). The network interface 508 is operatively coupled to an external storage media 509.

The components of the host device architecture 500 described above can exchange communications and data over one or more buses 514 (e.g., EISA/ISA, PCI, PCI-Express) for facilitating the transfer of data and control signals between the component of the architecture 500.

The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 512 further includes an operating system 516 (e.g., Mac OS®, Windows® XP, Linux® OS), a network communication module 518, a browser 520, and login window system 522 and a portable computer account module 524. The operating system 516 can be multi-user, multiprocessing, multitasking, multithreading, real time, etc. The operating system 516 performs basic tasks, including but not limited to: recognizing input from the input devices 508 and providing output to the display device 504; keeping track and managing files and directories on computer-readable mediums 512 (e.g., memory or a storage device); controlling peripheral devices (e.g., printers, external storage devices); and managing traffic on the one or more buses 514. The network communications module 518 includes various components for establishing and maintaining network connections and services (e.g., software for implementing communication protocols and services, such as TCP/IP, HTTP, sync services, etc.). The login window system 522 includes various software components for displaying and managing the login window and related processes. The browser 520 allows the user to access the World Wide Web (WWW).

The portable computer account module 524 includes various software components (e.g., written in Objective-C or other known computer languages) for performing the portable computer account process 400, as described in reference to FIGS. 4A-4C. The portable computer account module 524 can include multiple software components or it can be a single body of code.

Various modifications may be made to the disclosed implementations and still be within the scope of the following claims.

What is claimed is:

1. A method, comprising:
    detecting, by a host device, an external storage medium operatively coupled to the host device, the external storage medium storing portable account information, wherein the portable account information includes:
        a home directory of the portable account;
        authentication information of the portable account; and
        a user profile of the portable account;
    providing a login user interface for presentation on a display screen of the host device, the login user interface including one or more local accounts and the portable account for login;
    adding the portable account to a local directory database as a local account associated with the external storage medium, wherein adding the portable account comprises:
        determining whether the portable account has administrative privileges; and
        when the portable account has administrative privileges, removing the administrative privileges before adding the portable account to the local directory database;
    receiving, from a user of the host device, an input for logging in the local account associated with the external storage medium; and
    responsive to the input, logging in the user using the user profile of the portable account and designating the home directory of the portable account as stored on the external storage medium as a home directory of the user.

2. The method of claim 1, further comprising:
    if the local account has a corresponding network account, overwriting account information stored on the external storage medium with network account information.

3. The method of claim 2, further comprising:
    adding the local account to an approved account list; and
    allowing the login to proceed.

4. The method of claim 3, further comprising:
synchronizing the local account with the portable account.

5. The method of claim 1, further comprising:
encrypting a password associated with the portable account; and
storing the encrypted password on the external storage medium, where the encrypted password is information locally accessible by the host device to authenticate the user.

6. A non-transitory computer-readable storage medium having instructions stored thereon, which, when executed by a processor, causes the processor to perform operations comprising:
detecting, by a host device, an external storage medium operatively coupled to the host device, the external storage medium storing portable account information, wherein the portable account information includes:
a home directory of the portable account;
authentication information of the portable account; and
a user profile of the portable account;
providing a login user interface for presentation on a display screen of the host device, the login user interface including one or more local accounts and the portable account for login;
adding the portable account to a local directory database as a local account associated with the external storage medium, wherein adding the portable account comprises:
determining whether the portable account has administrative privileges; and
when the portable account has administrative privileges, removing the administrative privileges before adding the portable account to the local directory database;
receiving, from a user of the host device, an input for logging in the local account associated with the external storage medium; and
responsive to the input, logging in the user using the user profile of the portable account and designating the home directory of the portable account as stored on the external storage medium as a home directory of the user.

7. The non-transitory computer-readable medium of claim 6, the operations further comprising:
if the local account has a corresponding network account, overwriting account information stored on the external storage medium with network account information.

8. The non-transitory computer-readable medium of claim 7, further comprising:
adding the local account to an approved account list; and
allowing the login to proceed.

9. The non-transitory computer-readable medium of claim 6, the operations further comprising:
encrypting a password associated with the portable account; and
storing the encrypted password on the external storage medium, where the encrypted password is information locally accessible by the host device to authenticate the user.

10. A system, comprising:
one or more processors configured to perform operations comprising:
detecting, by a host device, an external storage medium operatively coupled to the host device, the external storage medium storing portable account information, wherein the portable account information includes:
a home directory of the portable account;
authentication information of the portable account; and
a user profile of the portable account;
providing a login user interface for presentation on a display screen of the host device, the login user interface including one or more local accounts and the portable account for login;
adding the portable account to a local directory database as a local account associated with the external storage medium, wherein adding the portable account comprises:
determining whether the portable account has administrative privileges; and
when the portable account has administrative privileges, removing the administrative privileges before adding the portable account to the local directory database;
receiving, from a user of the host device, an input for logging in the local account associated with the external storage medium; and
responsive to the input, logging in the user using the user profile of the portable account and designating the home directory of the portable account as stored on the external storage medium as a home directory of the user.

11. The system of claim 10, the operations further comprising:
encrypting a password associated with the portable account; and
storing the encrypted password on the external storage medium, where the encrypted password is information locally accessible by the host device to authenticate the user.

12. The system of claim 10, the operations further comprising:
if the local account has a corresponding network account, overwriting account information stored on the external storage medium with network account information.

13. The system of claim 12, the operations further comprising:
adding the local account to an approved account list; and
allowing the login to proceed.

14. The system of claim 13, the operations further comprising:
synchronizing the local account with the portable account.

* * * * *

UNITED STATES PATENT AND TRADEMARK OFFICE
CERTIFICATE OF CORRECTION

Page 1 of 1

PATENT NO.      : 8,307,425 B2
APPLICATION NO. : 11/499170
DATED           : November 6, 2012
INVENTOR(S)     : Bruce Gaya It is certified that error appears in the above-identified patent and that said Letters Patent is hereby corrected as shown below:

In the claims

Column 8, line 38 (Claim 1, line 6): "the portable account;" should read -- a portable account; --.

Column 8, line 51 (Claim 1, line 19): "administrative privileges," should read -- the administrative privileges, --.

Column 9, line 17 (Claim 6, line 9): "the portable account;" should read -- a portable account; --.

Column 9, line 30 (Claim 6, line 22): "administrative privileges," should read -- the administrative privileges, --.

Column 10, line 9 (Claim 10, line 9): "the portable account;" should read -- a portable account; --.

Column 10, line 23 (Claim 10, line 23): "administrative privileges," should read -- the administrative privileges, --.

Signed and Sealed this
Third Day of November, 2015

Michelle K. Lee
*Director of the United States Patent and Trademark Office*